(12) United States Patent
Tokuda et al.

(10) Patent No.: US 12,492,094 B2
(45) Date of Patent: Dec. 9, 2025

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventors: Akihiko Tokuda, Chiba (JP); Katsushi Yoshida, Niigata (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 18/068,358

(22) Filed: Dec. 19, 2022

(65) Prior Publication Data
US 2023/0202791 A1    Jun. 29, 2023

(30) Foreign Application Priority Data
Dec. 23, 2021 (JP) .................. 2021-209601

(51) Int. Cl.
*B65H 35/00* (2006.01)
(52) U.S. Cl.
CPC .... *B65H 35/008* (2013.01); *B65H 2301/5111* (2013.01); *B65H 2301/5152* (2013.01); *B65H 2701/12112* (2013.01)

(58) Field of Classification Search
CPC .............. B65H 35/0006; B65H 35/008; B65H 2301/5152
See application file for complete search history.

(56) References Cited

U.S. PATENT DOCUMENTS

2002/0175958 A1\* 11/2002 Natori ................... G06K 15/02
347/5
2019/0361646 A1\* 11/2019 Hori ................... H04N 1/00456

FOREIGN PATENT DOCUMENTS

JP           2005215895 A      8/2005

\* cited by examiner

*Primary Examiner* — Ibrahim Siddo
(74) *Attorney, Agent, or Firm* — Canon U.S.A., Inc. IP Division

(57) ABSTRACT

An information processing apparatus includes a perforation processing setting unit configured to set whether to perform perforation processing of forming a perforation-shaped cut in a physical medium, a line setting unit configured to set whether to print a line at a position corresponding to a position of the perforation-shaped cut on the physical medium, and an instruction unit configured to instruct a printing apparatus to perform the perforation processing and to print the line based on the setting by the perforation processing setting unit and the setting by the line setting unit.

20 Claims, 21 Drawing Sheets

901: <Printer PrinterC_192.168.1.10_>
902:    Info PrinterC
903:    Location 2F
904:    DeviceURI lpd://192.168.1.10
905:    DriverName ABC PDL1
906: </Printer>
```

```
1001: *% Printer Description for Printer C
1002: *Manufacuturer: "ABC"
1003: *Product: "Printer C"
1004: *PrinterLanguage: ABC PDL1
1005: *DriverVersion: "PDL1 1.00"

1006: *OpenUI *PageSize: PickOne
1007: *DefaultPageSize: A4
1008: *PageSize A3
1009: *PageSize A4
       . . . . . .
1010: *CloseUI *PageSize 1011: *OpenUI *Duplex: PickOne
1012: *DefaultDuplex: None
1013: *Duplex None
1014: *Duplex Simplex
1015: *Duplex Duplex
1016: *CloseUI *Duplex
```

1401

1402

1403

INFORMATION PROCESSING APPARATUS, METHOD FOR CONTROLLING INFORMATION PROCESSING APPARATUS, AND STORAGE MEDIUM

BACKGROUND

Field of the Disclosure

The present disclosure relates to an information processing apparatus, a method for controlling the information processing apparatus, and a storage medium.

Description of the Related Art

A printer driver is installed in a host computer to generate print data, and transmit the print data to a printing apparatus connected to the host computer. The printer driver converts data of various applications running on the host computer into print data.

In recent years, finishers capable of performing various types of processing have been developed, and some of the finishers can even perform perforation processing on mediums to be output. The perforation processing is the processing of forming small cuts in the shape of mainly a dotted line in an output medium such as paper so that the medium can be cut neatly along a predetermined position. Further, there are many deliverables on which a dotted line indicating a cut line is printed over a perforated portion.

A printer driver has a poster printing function of printing a single page on a plurality of sheets to thereby generate a physically large deliverable. The poster printing involves a process of bonding the plurality of sheets together without causing a misalignment in a deliverable. Japanese Patent Application Laid-Open No. 2005-215895 discusses a printer driver that prints a glue line or a cut line to reduce misalignments. Further, finishers that perform fold processing on a medium to be output so that the medium can be folded neatly along a predetermined position have been developed.

In a case where the perforation processing or the fold processing is to be performed, in order to align a processing position with a dotted line (hereinafter, referred to as "processing line") indicating a perforation or a fold line, the processing line is conventionally generated on an application that generates print data. However, Japanese Patent Application Laid-Open No. 2005-215895 does not mention a relationship with a perforation processing apparatus, and it is difficult to align a position to be processed on a sheet for use in outputting with a position of the processing line generated on the application as intended. Thus, there is a need that user efforts and printing may be repeated depending on a function of the application.

SUMMARY

According to an aspect of the present disclosure, an information processing apparatus includes a processing setting unit configured to set whether to perform predetermined processing on a physical medium, a line setting unit configured to set whether to print a line at a position corresponding to a position on which the predetermined processing is to be performed on the physical medium, and an instruction unit configured to instruct a printing apparatus to perform the predetermined processing and to print the line based on the setting by the processing setting unit and the setting by the line setting unit.

Further features of the present disclosure will become apparent from the following description of exemplary embodiments with reference to the attached drawings.

BRIEF DESCRIPTION OF THE DRAWINGS

FIG. 9 is a diagram illustrating a registration queue file.

FIG. 10 is a diagram illustrating a printer specification description file.

DESCRIPTION OF THE EMBODIMENTS

System Configuration

Figure 1:
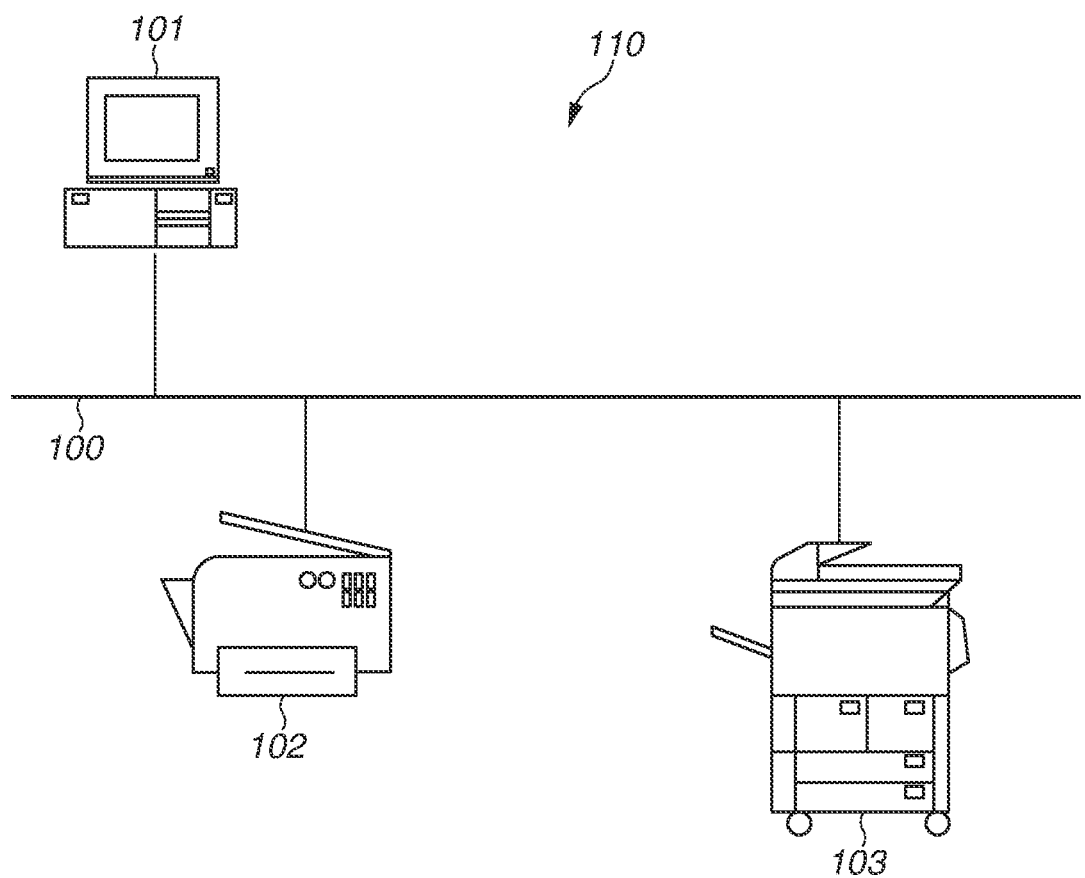
FIG. 1 is a diagram illustrating an example of a configuration of an information processing system.

FIG. 1 is a diagram illustrating an example of a configuration of an information processing system 110 according to a first exemplary embodiment. The information processing system 110 includes a network 100, a host computer 101, and printing apparatuses 102 and 103. The host computer 101 and the printing apparatuses 102 and 103 are each connected to the network 100. The host computer 101 is an example of an information processing apparatus. The printing apparatuses 102 and 103 are, for example, printers or multi-function peripherals (MFPs).

Figure 2:
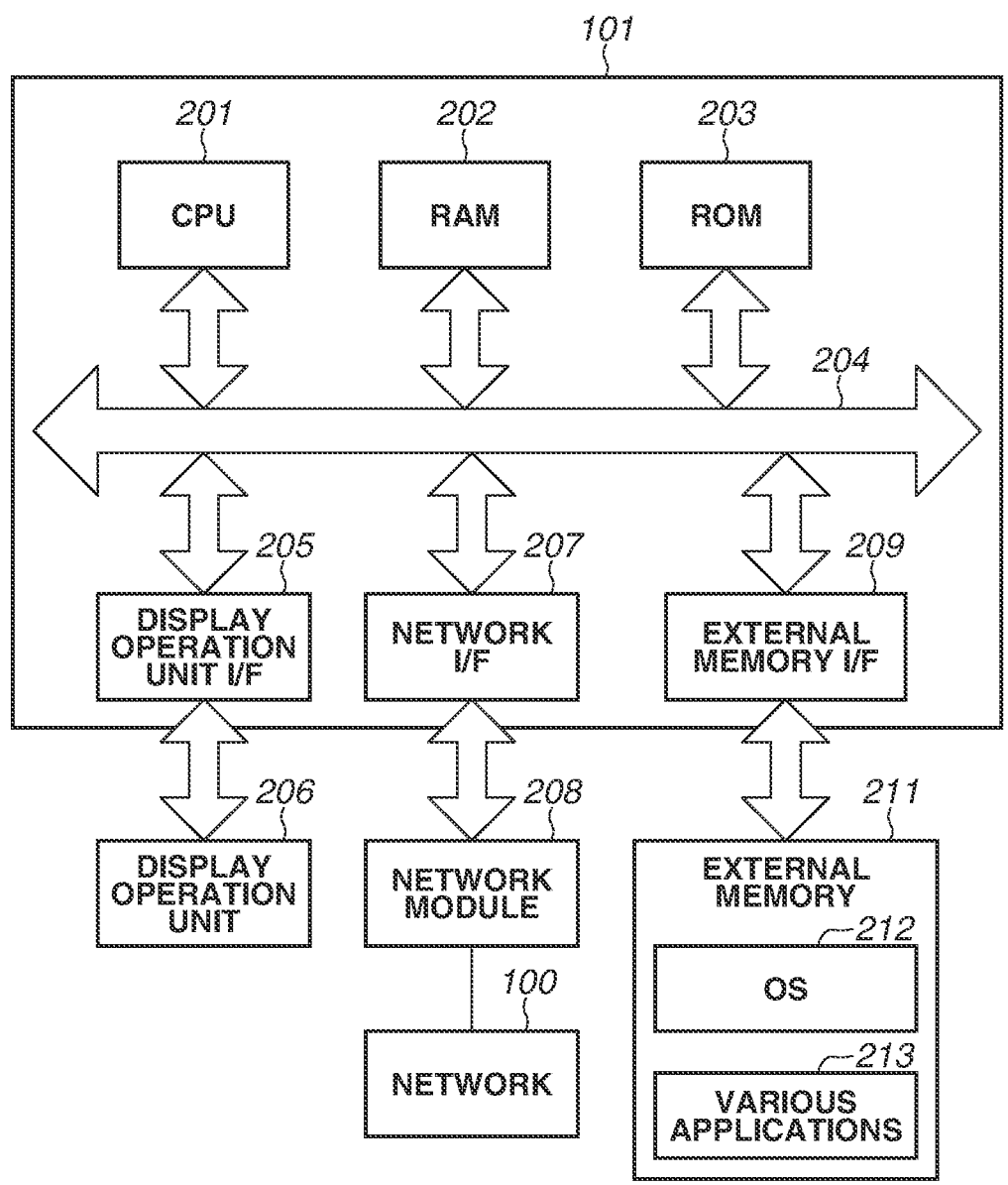
FIG. 2 is a diagram illustrating an example of a configuration of a host computer.

FIG. 2 is a block diagram illustrating an example of a hardware configuration of the host computer 101. The host computer 101 includes a central processing unit (CPU) 201, a random access memory (RAM) 202, a read-only memory (ROM) 203, a system bus 204, a display operation unit interface (display operation unit I/F) 205, a network interface (network I/F) 207, and an external memory interface (external memory I/F) 209. A display operation unit 206, a network module 208, and an external memory 211 are connected to the host computer 101.

The CPU 201 comprehensively controls the components connected to the system bus 204 based on programs stored in the RAM 202. The RAM 202 also functions as a main memory of the CPU 201 and a work area. The ROM 203 stores various basic programs and data of the host computer 101.

The display operation unit I/F 205 performs information display control on the display operation unit 206. While including a display function, the display operation unit 206 is configured as a touch panel and controls input from a user. The network I/F 207 controls the network module 208 and realizes communication with the network 100.

The external memory I/F 209 controls access to an external memory 211. The external memory 211 is, for example, a flash memory or a solid state disk. The external memory 211 stores an operating system (hereinafter, "OS") 212 and various applications 213, and functions as a storage medium that can be used by the host computer 101 for storing or reading. The various applications 213 include a printer driver.

Processing of the host computer 101 is realized by the OS 212 in the host computer 101 by causing the CPU 201 to execute the printer driver loaded in the RAM 202.

Basic Flow of Printer Driver Installation and Print Queue Registration

Figure 3:
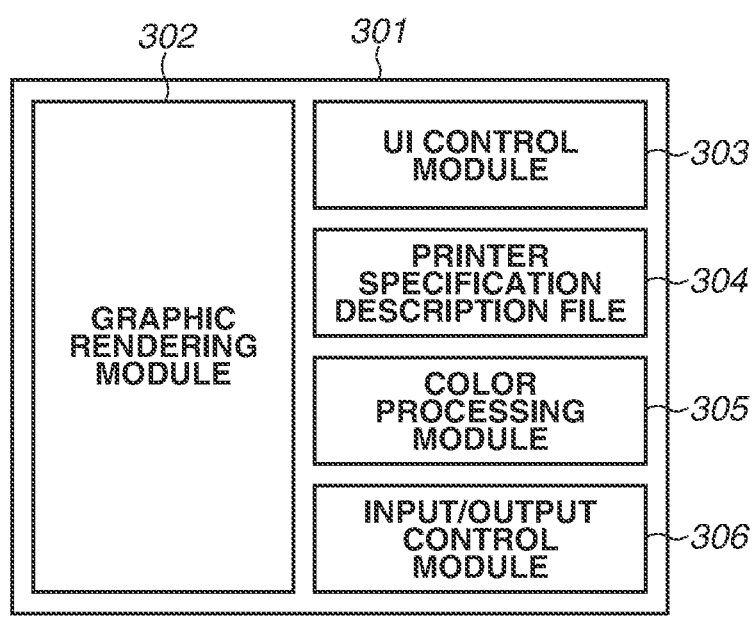
FIG. 3 is a diagram illustrating an example of a module configuration of a printer driver.

FIG. 3 is a diagram illustrating an example of a module configuration of a printer driver 301. The printer driver 301 includes a graphic rendering module 302, a user interface (UI) control module 303, a printer specification description file 304, a color processing module 305, and an input/output control module 306. The printer driver 301 can include other modules depending on functions.

There are several forms of generating the printer driver 301. For example, in order for one printer driver 301 to support a plurality of printers, the graphic rendering module 302 and the UI control module 303 are generated to support a plurality of printers. Further, the printer driver 301 is bundled with printer specification description files 304 corresponding to the number of supported printers. In this method, the UI control module 303 displays and controls UIs based on the printer specification description files 304. Further, the graphic rendering module 302 is configured to issue page description languages and printer control commands for the printers. A basic process of installing the printer driver 301 having the foregoing configuration in the host computer 101 will now be described.

Figure 4:
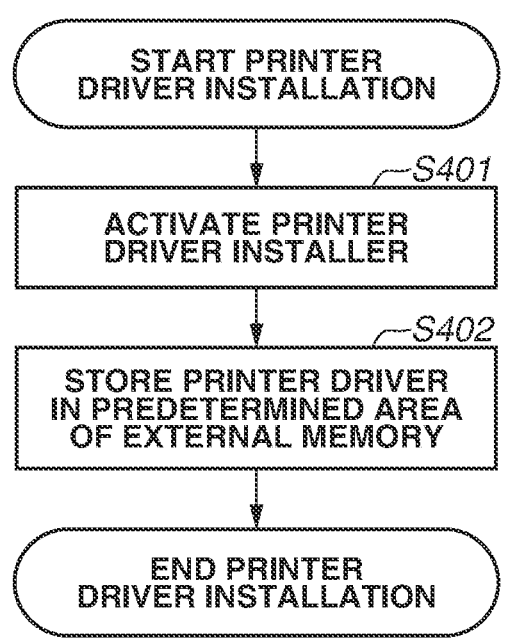
FIG. 4 is a flowchart illustrating a process of installing the printer driver.

FIG. 4 is a flowchart illustrating a process of installing the printer driver 301. The user is assumed to have prepared a compact disk ROM (CD-ROM) storing the printer driver 301 or obtained a printer driver installer via the network 100.

In step S401, the user activates the obtained printer driver installer in the host computer 101. In the host computer 101, the CPU 201 starts processing by the printer driver installer.

In step S402, the CPU 201 stores the printer driver 301 in a predetermined area of the external memory 211 through the processing by the printer driver installer. As to the storage location, for example, in a common UNIX printing system (CUPS), the printer driver 301 is stored according to each printer vendor under the directory "/Library/Printers/". Further, the printer driver 301 can also be stored according to type of the printer driver 301 under the directory for each printer vendor. For example, there are different printer drivers PDL1 and PDL2 of a printer vendor ABC. In this case, directories "/Library/Printers/ABC/PDL1/" and "/Library/Printers/ABC/PDL2/" are generated. The printer drivers PDL1 and PDL2 can then respectively be stored under the directories.

In step S402, the CPU 201 stores the printer driver 301 in the above-described directory of the external memory 211 through the processing by the printer driver installer. Then, the installation of the printer driver 301 is completed. In order for the host computer 101 to output page description language (PDL) data to a printer, the user is to associate the printer driver 301 with the printer and register a print queue. The printer is, for example, the printing apparatus 102 or 103 illustrated in FIG. 1.

Figure 5:
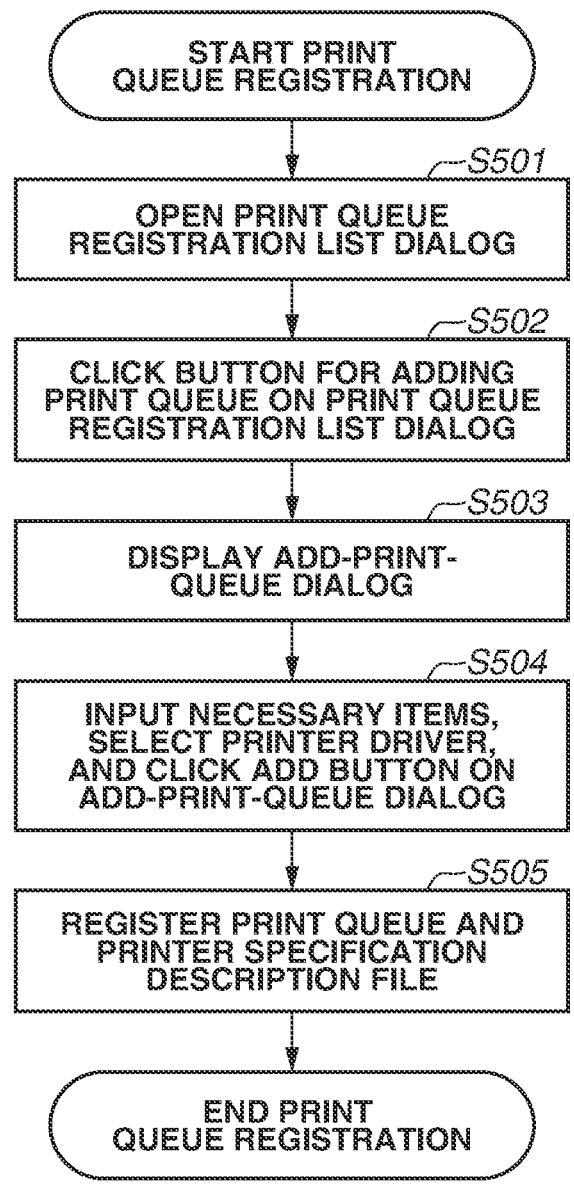
FIG. 5 is a flowchart illustrating a print queue registration process for the printer driver.

FIG. 5 is a flowchart illustrating a print queue registration process. In step S501, the user opens a print queue registration list dialog. The CPU 201 reads a program for the print queue registration from the external memory 211 to the RAM 202 and executes the read program through the processing by the OS 212. The CPU 201 displays a print queue registration list dialog 601 illustrated in FIG. 6 on the display operation unit 206.

Figure 6:
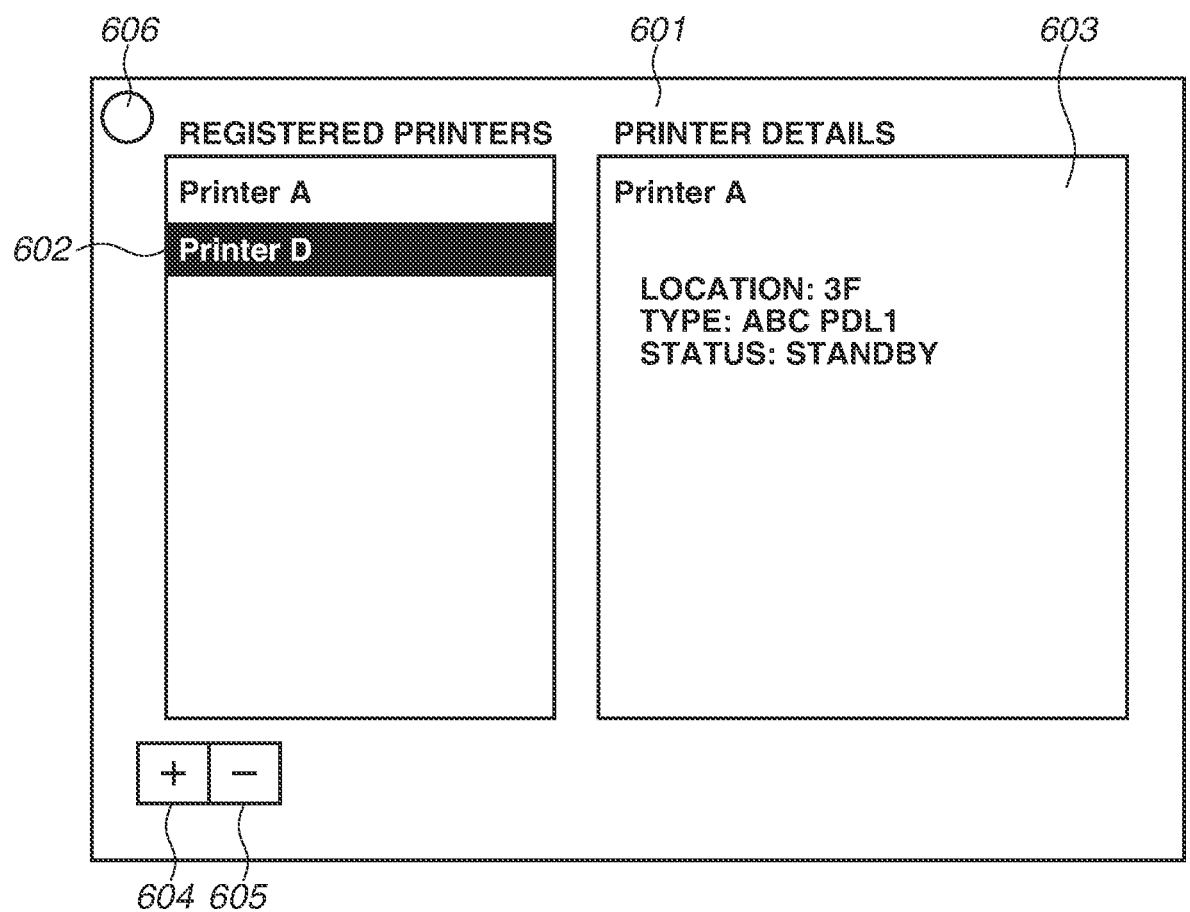
FIG. 6 is a diagram illustrating a print queue registration user interface.

FIG. 6 is a diagram illustrating the print queue registration list dialog 601 displayed by the CPU 201. The print queue registration list dialog 601 includes a registered print queue list 602 and a print queue details display region 603. The registered print queue list 602 displays a list of currently-registered print queues (expressed as "printers" in FIG. 6). The print queue details display region 603 displays details information about a selected print queue on the registered print queue list 602. A button 604 is a button for registering a print queue. A button 605 is a button for deleting a selected print queue in the current registered print queue list 602. A button 606 is a button for closing the print queue registration list dialog 601.

In step S502, the user clicks the button 604 for adding a print queue on the print queue registration list dialog 601. The CPU 201 detects the click operation on the button 604 of the display operation unit 206 performed by the user.

Figure 7:
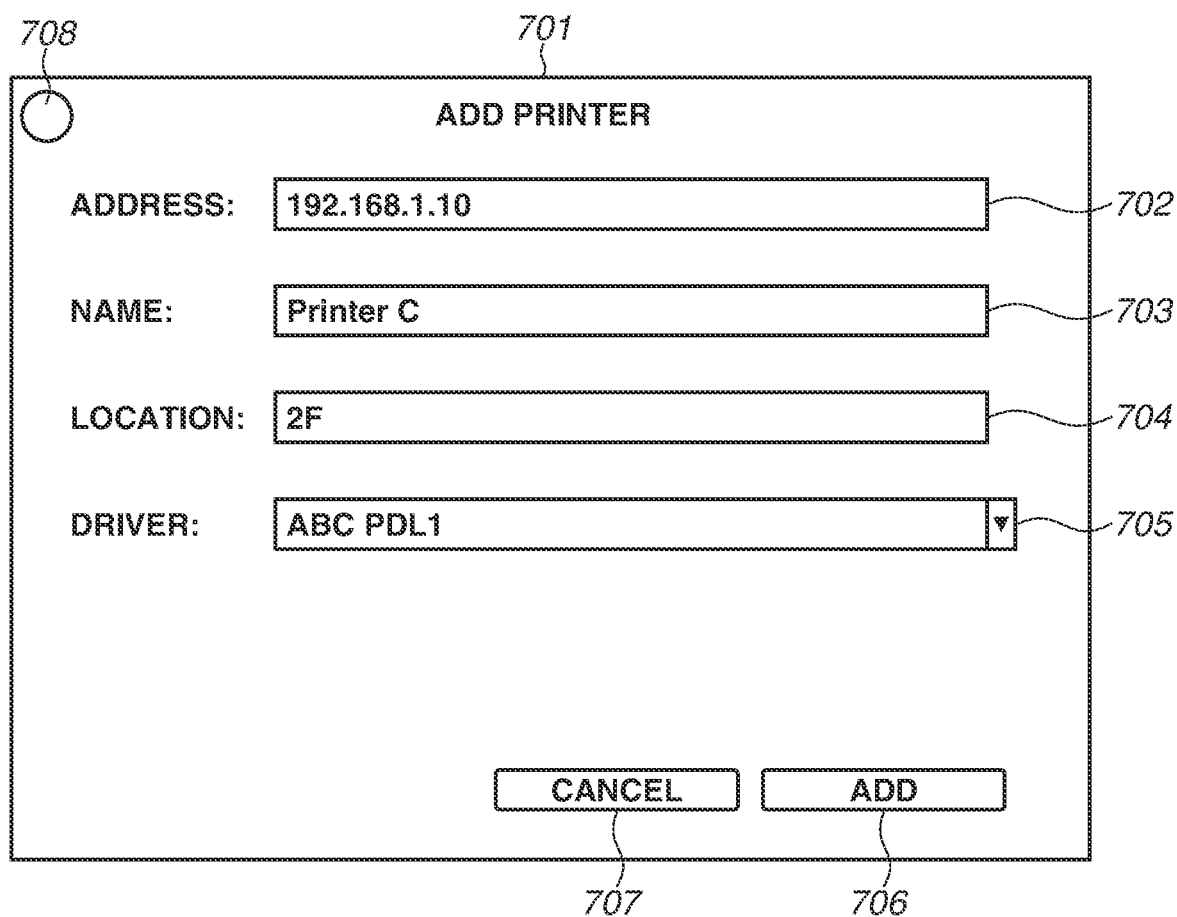
FIG. 7 is a diagram illustrating an add-print-queue user interface.

In step S503, the CPU 201 displays an add-print-queue dialog 701 illustrated in FIG. 7 on the display operation unit 206 based on the user operation.

FIG. 7 is a diagram illustrating the add-print-queue dialog 701. An address 702 of the add-print-queue dialog 701 is a region for designating a network address (Internet Protocol (IP) address in this example) of a connected printer. A name 703 is a field for entering a name of the printer for identifying the print queue. A location 704 is a field for entering a location where the printer is installed. The name 703 and the location 704 of the printer are character strings that are used in displaying in the registered print queue list 602 and the print queue details display region 603 illustrated in FIG. 6. A driver 705 is a region for designating a printer driver for use in registering the print queue. Each printer driver listed in the driver 705 is a printer driver stored in the above-described printer driver storage directory (/Library/Printers). In the example in FIG. 7, "192.168.1.10", "Printer C", "2F", and "ABC PDL1" are respectively selected in the address 702, the name 703 of the print queue, the location 704, and the driver 705 of the printer. In this state, in a case where an add button 706 is clicked, the CPU 201 adds the print queue. A cancel button 707 is a button for cancelling the addition of the print queue. To close the add-print-queue dialog 701 without adding the print queue, the user clicks a close-dialog button 708.

In step S504, the user inputs the address 702, the name 703, and the location 704, selects a printer driver in the driver 705, and clicks the add button 706 on the add-print-queue dialog 701.

In step S505, the CPU 201 registers the print queue and the printer specification description file 304 based on the address 702, the name 703, the location 704, and the driver 705 of the printer. This step S505 will now be described with reference to FIG. 8.

Figure 8:
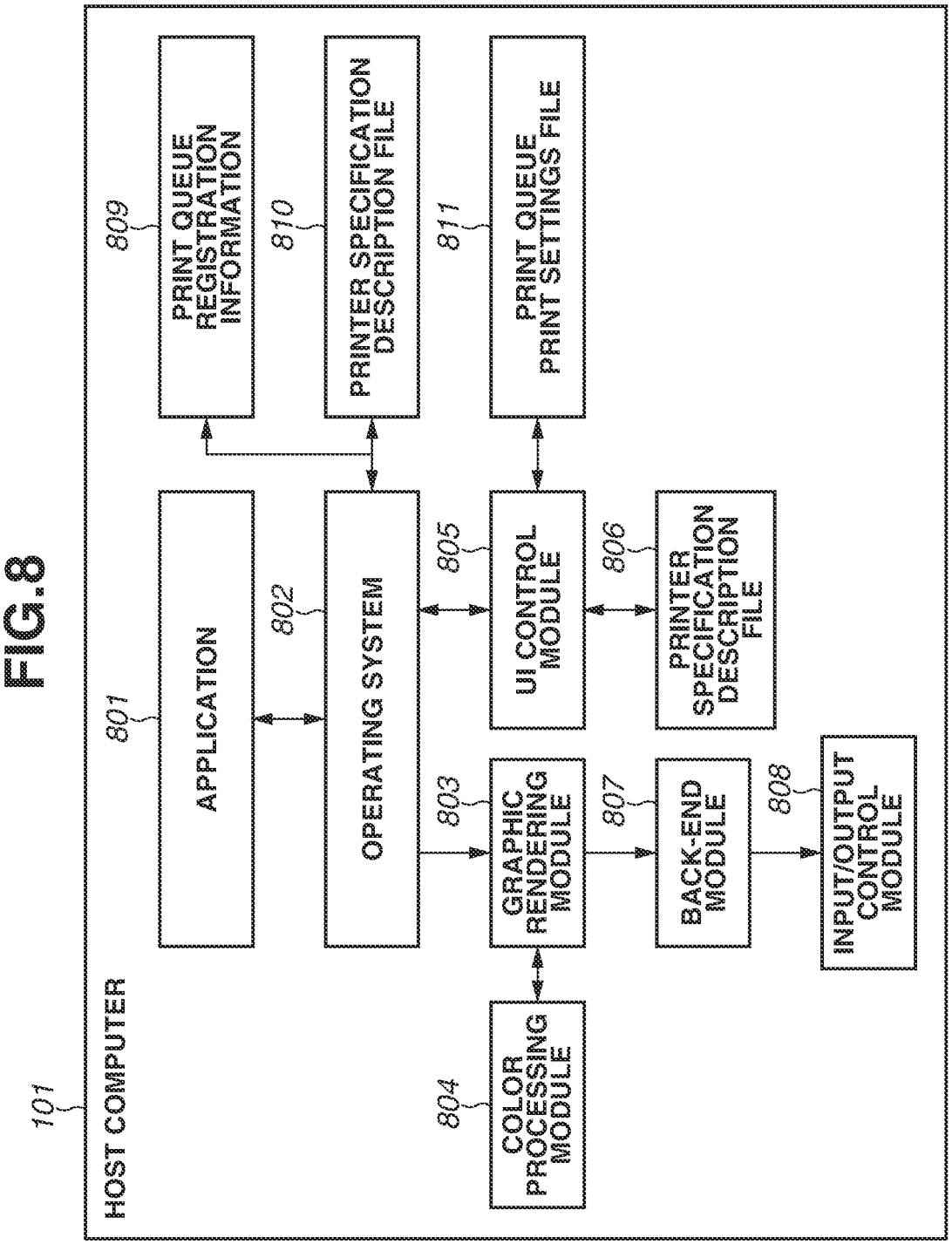
FIG. 8 is a diagram illustrating an example of a configuration of the host computer.

FIG. 8 is a diagram illustrating an example of a configuration of the host computer 101. The host computer 101 in FIG. 8 is in a state where the printer driver 301 is installed and the print queue is registered. The host computer 101 stores an application 801, an OS 802, a graphic rendering module 803, a color processing module 804, a UI control module 805, and a printer specification description file 806. The host computer 101 further stores a back-end module 807, an input/output control module 808, print queue registration information 809, a printer specification description file 810, and a print queue print settings file 811.

The graphic rendering module 803 is the graphic rendering module 302 of the printer driver 301 in FIG. 3 that is installed in the predetermined directory (/Library/Printers/) through the above-described process. Similarly, the UI control module 805 is the UI control module 303 of the printer driver 301 illustrated in FIG. 3 that is installed. The color processing module 804 is the color processing module 305 of the printer driver 301 illustrated in FIG. 3 that is installed. The input/output control module 808 is the input/output control module 306 of the printer driver 301 illustrated in FIG. 3 that is installed. The printer specification description file 806 is the printer specification description file 304 of the printer driver 301 illustrated in FIG. 3 that is installed.

The back-end module 807 is a module for passing print data generated by the graphic rendering module 803 to the input/output control module 808 for transmitting the print data to the printer. The print queue registration information 809, the printer specification description file 810, and the print queue print settings file 811 are generated during the print queue registration illustrated in FIG. 5, and details thereof will now be described.

In step S505, the CPU 201 collects information regarding the add-print-queue dialog 701 through the processing by the OS 802 and performs a print queue registration operation. The registration is performed as described below.

FIG. 9 illustrates a file 900 describing information about the print queue to be registered in a markup language. The file 900 includes an identifier 901, a name 902, a location 903, a print queue 904, a printer driver name 905, and an end description 906. The identifier 901 is an identifier of the print queue and describes the name of the print queue (printer) followed by the address of the print queue with an underscore between the name and the address. The name 902 describes the name of the print queue. The location 903 describes the location of the print queue. The print queue 904 describes the actual print queue, and in this example, transmission to the address 192.168.1.10 using the lpd protocol is to be performed. The printer driver name 905 describes the name (ABC PDL1 in this example) of the printer driver that the print queue uses. The end description 906 indicates that the descriptions of the print queue end.

In step S505, the CPU 201 generates the descriptions of the file 900 and adds registration information about the print queue to a predetermined file in the external memory 211 through the processing by the OS 802. The predetermined file is, for example, a "printers.conf" file stored in a directory "/etc/cups/" in the CUPS system. The predetermined file corresponds to the print queue registration information 809. In a case where a plurality of print queues is registered, the descriptions of the file 900 in FIG. 9 are repeated for each print queue in "printers.conf", and the number of the repeated descriptions corresponds to the number of the plurality of print queues.

In step S505, the CPU 201 registers the printer specification description file 806 through the processing performed by the OS 802. The CPU 201 acquires the printer specification description file 806 for the print queue to be registered and registers the printer specification description file 810 in a predetermined portion prepared for the print queue through the processing by the UI control module 805. Prior to descriptions of a method for registering the printer specification description file 806, the printer specification description file 806 will be described.

FIG. 10 is a diagram illustrating an example of the printer specification description file 806. The printer specification description file 806 is described based on a print queue specification description format and includes descriptions 1001 to 1016. The descriptions 1001 to 1016 will be described below as well as formats.

The description 1001 describes a comment. The comment includes "*%" at its beginning.

The description 1002 describes a printer vendor name. The description 1003 describes the name of the print queue to which the printer specification description file 806 corresponds. The description 1004 describes the page description language to which the printer specification description file 806 corresponds. The description 1005 describes the version of the printer driver.

Thereafter, function specifications of the print queue are described. In the function specifications, lines from a line with "*OpenUI" (e.g., the description 1006) to a line with "*CloseUI" (e.g., description 1010) correspond to one function. After "*OpenUI", a function name with "*" added at the beginning is described, and after the function name, ":" terminates the function name to describe a type in selecting the function. The type includes "PickOne" and "Boolean". "PickOne" indicates that one of options is to be selected. "Boolean" indicates that the function is on/off controlled. The description 1006 includes a function "*PageSize", and the function indicates that one of options is to be selected.

The description 1007 on a line following the description 1006 describes a default value of the function of the description 1006. The description 1007 starts with "*Default" followed by the function name defined in the description 1006 on the previous line. The description 1007 indicates that the default of the function "PageSize" is A4.

From the description 1008 to the description 1010 of "*CloseUI", options of the function "PageSize" are described one option on each line. For example, the description 1008 indicates that one of the options of "PageSize" is A3. The descriptions 1008 and 1009 describe a function of selecting a page size. Since the page size has many options, an intermediate portion is omitted.

The last description of the function is the description 1010. The description 1010 describes the function name described in "*OpenUI" in the description 1006 after "*CloseUI". The foregoing descriptions define the one function.

Next descriptions 1011 to 1016 are descriptions of another function. While redundant descriptions are omitted, the descriptions 1011 to 1016 indicate that there is a function referred to as "Duplex", which selects one of options, namely "None", "Simplex", and "Duplex". The foregoing descriptions actually define a function of designating two-sided printing. "None" indicates that no designation is made and thus a default setting of the print queue is to be used. "Simplex" indicates one-sided printing. "Duplex" indicates two-sided printing.

Figure 14A:
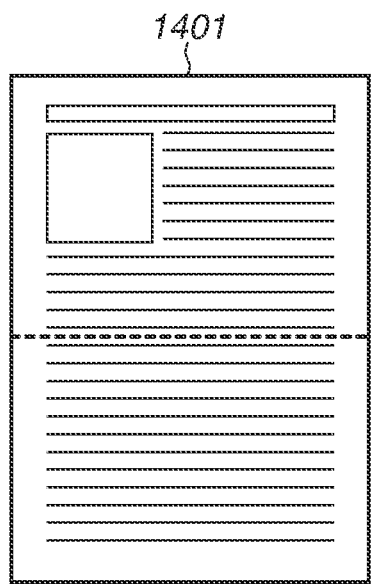
FIGS. 14A to 14C are diagrams illustrating an example of a print in a case where a perforation line position is added or in a case where the perforation line position and characters or marks are added.

A function of the perforation processing is also described in the printer specification description file 806 illustrated in FIG. 10. For example, the printer specification description file 806 describes that a default value for the perforation is "Off" and that a setting is to be set from "Off", "One", and "Two" in "PickOne" form. The option "One" is an option that is intended to perform the perforation processing along a center of a sheet as illustrated in FIG. 14A. The option "Two" is an option that is intended to perform the perforation processing along positions to divide a sheet equally into three.

A method for registering the printer specification description file 806 by the CPU 201 through the processing by the OS 802 will now be described. The CPU 201 acquires the printer specification description file 806 corresponding to the print queue and stores the printer specification description file 810 in the predetermined area through the processing by the UI control module 805.

Figure 11:
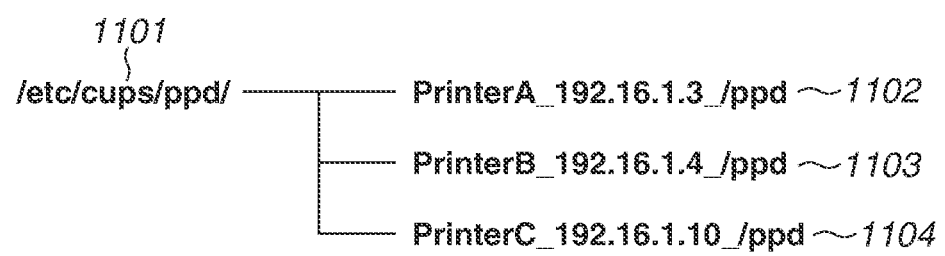
FIG. 11 is a diagram illustrating an example of storing a printer specification description file registered by an operating system (OS).

FIG. 11 is a diagram illustrating a storage location of the printer specification description file 810 and files therein. The storage location is a directory 1101 "/etc/cups/ppd/" in the external memory 211. File names of files 1102 to 1104 stored in the storage location are each formed by the name of the print queue followed by an underscore and the address of the print queue. The printer specification description file 810 that is added is the file 1104 "PrinterC_192.168.1.10_.ppd". The CPU 201 stores the printer specification description file 806 in the printer specification description file 810 through the processing by the OS 802. Through the foregoing steps, the print queue registration in FIG. 5 is completed.

Figure 12A:
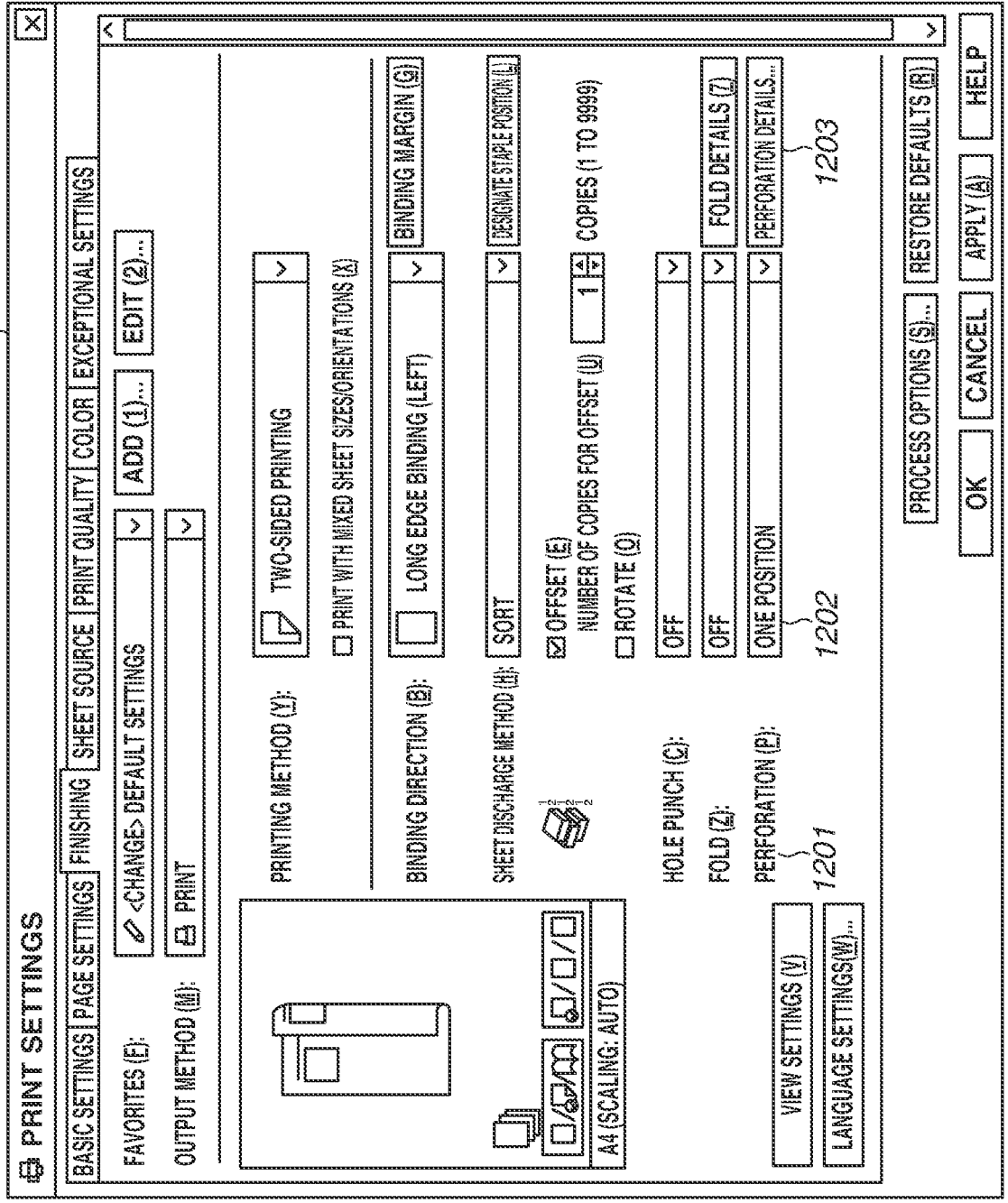
FIGS. 12A and 12B are diagrams illustrating an example of a display of the printer driver.
Figure 12B:
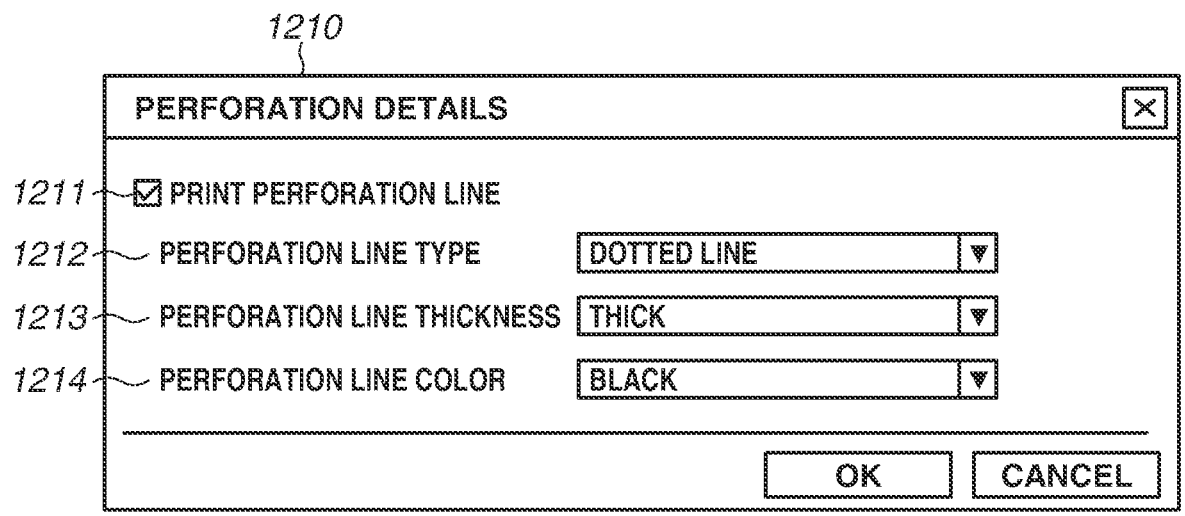

FIGS. 12A and 12B are diagrams illustrating an example of a display of the printer driver 301 according to the first exemplary embodiment. The CPU 201 displays a print setting dialog 1200 in FIG. 12A through the processing by the printer driver 301. The user can input an item 1202 to designate perforation processing 1201 and can click a perforation details button 1203 on the print setting dialog 1200.

For example, "OFF", "ONE POSITION", or "TWO POSITIONS" can be selected in the item 1202. The "OFF" in the item 1202 indicates that the perforation processing is not to be performed. The "ONE POSITION" in item 1202 indicates that the perforation processing is to be performed along one line at a center of a sheet as illustrated in FIG. 14A. The "TWO POSITIONS" in the item 1202 indicates that the perforation processing is to be performed along two lines to divide a sheet equally into three. In a case where an option other than the "OFF" is selected in the item 1202, the perforation details button 1203 becomes available. Note that in a case where the connected printer does not include hardware for performing the perforation processing, the item 1202 is grayed out and cannot be set even in a case where the printer specification description file 806 describes a setting value relating to the perforation processing. The item 1202 can be hidden in a case where the connected printer does not include hardware for performing the perforation processing.

In a case where the perforation details button 1203 is clicked, the CPU 201 displays a perforation details dialog 1210 illustrated in FIG. 12B. The user can set a print-perforation-line setting 1211, a perforation line type 1212, a perforation line thickness 1213, and a perforation line color 1214 on the perforation details dialog 1210. The perforation details dialog 1210 is displayed based on perforation line information described in the printer specification description file 806.

The print-perforation-line setting 1211 can be set to "ON" or "OFF". In a case where the print-perforation-line setting 1211 is set to "OFF", the perforation processing is performed while the printing of a perforation line on a perforation processing target position is not performed. For the perforation line type 1212, for example, "solid line", "dotted line", or "broken line" can be selected. For the perforation line thickness 1213, for example, "thin", "normal", or "thick" can be selected. For the perforation line color 1214, for example, "black", "gray", or "red" can be selected.

A finisher capable of performing the perforation processing on mediums is attached to the printing apparatuses 102 and 103. The perforation processing is the processing of forming small cuts in the shape of mainly a dotted line in an output medium, such as paper, so that the medium can be cut neatly along a predetermined position. The CPU 201 can instruct the printing apparatus 102 or 103 to perform the perforation processing at a designated position on a medium based on the setting of the item 1202 for designating the perforation processing 1201.

Figure 13:
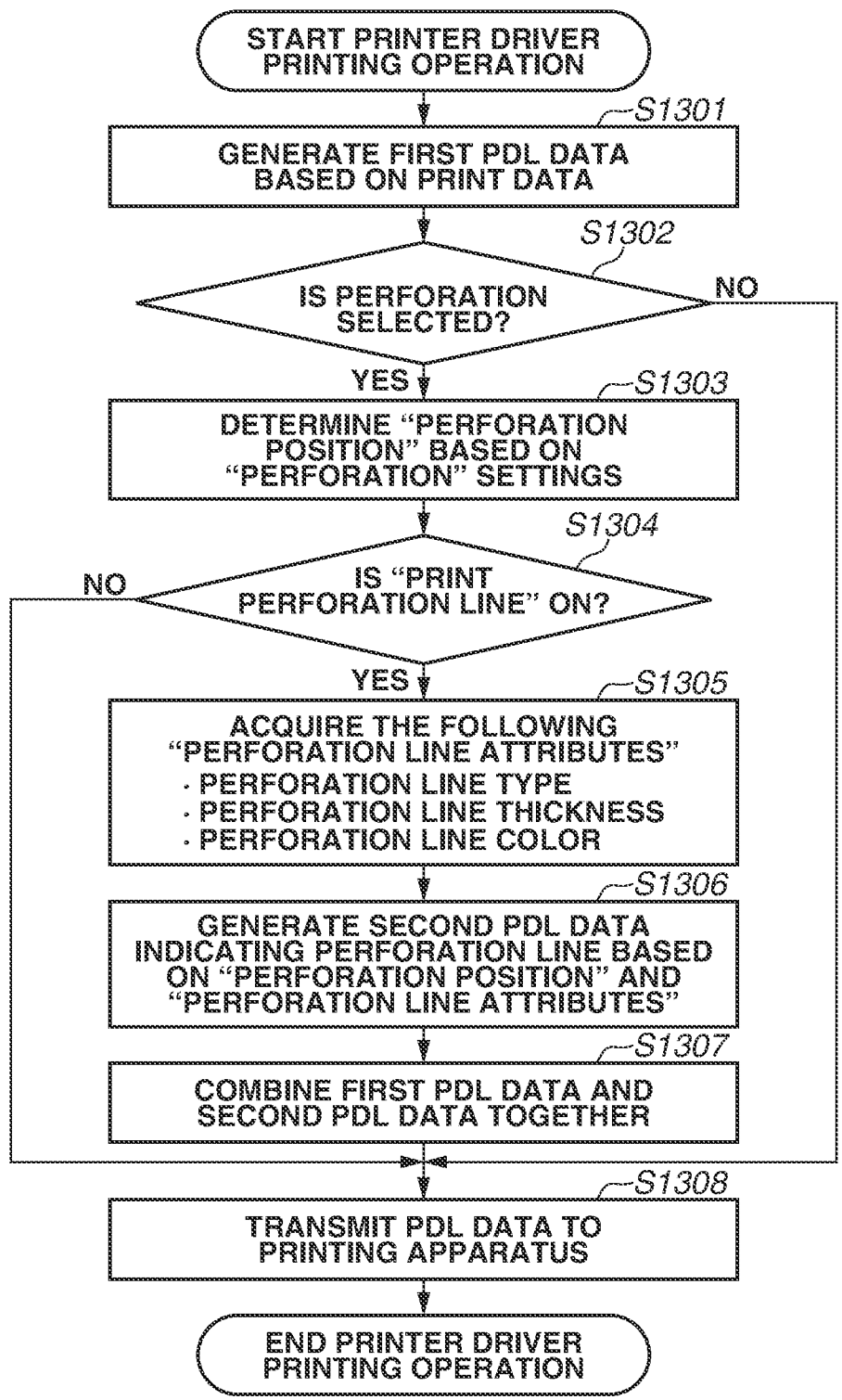
FIG. 13 is a flowchart illustrating a processing method of the printer driver.

FIG. 13 is a flowchart illustrating a processing method of the printer driver 301 of the host computer 101. When the printer driver 301 is activated, the CPU 201 starts a process illustrated in the flowchart in FIG. 13. The user can designate the perforation processing.

In step S1301, the CPU 201 generates first PDL data from print data generated by the application 801 in order to cause the designated printing apparatus 102 or 103 to perform printing. In step S1302, the CPU 201 determines whether the item 1202 for designating the perforation processing 1201 is set to a setting that designates the perforation processing. In a case where the item 1202 is set to an option other than "OFF", the item 1202 is set to a setting that designates the perforation processing. In a case where the item 1202 is set to a setting that designates the perforation processing (YES in step S1302), the processing proceeds to step S1303. On the other hand, in a case where the item 1202 is not set to a setting that designates the perforation processing (NO in step S1302), the processing proceeds to step S1308. In step S1308, the CPU 201 transmits the first PDL data to the designated printing apparatus 102 or 103, and the process in the flowchart in FIG. 13 is ended.

In step S1303, the CPU 201 determines a perforation processing target position based on the item 1202 for designating the perforation processing 1201. The user can select a perforation processing target position using the item 1202 for designating the perforation processing 1201. The CPU 201 sets a perforation processing target position based on the information selected in the item 1202.

In step S1304, the CPU 201 determines whether the setting 1211 for designating the printing of perforations is on. In a case where the setting 1211 for designating the printing of perforations is on (YES in step S1304), the processing proceeds to step S1305. In contrast, in a case where the setting 1211 for designating the printing of perforations is not on (NO in step S1304), the processing proceeds to step S1308.

In step S1308, the CPU 201 transmits a perforation processing instruction and the first PDL data to the designated printing apparatus 102 or 103, and the process in the flowchart in FIG. 13 is ended.

In step S1305, the CPU 201 acquires setting information about the perforation line type 1212, the perforation line thickness 1213, and the perforation line color 1214, of the perforation line to be printed. In step S1306, the CPU 201 generates second PDL data indicating the perforation line to be printed based on the determined perforation processing target position, the perforation line type 1212, the perforation line thickness 1213, and the perforation line color 1214 of the perforation line to be printed. A perforation line printing position is the perforation processing target position.

In step S1307, the CPU 201 combines the first PDL data generated in step S1301 and the second PDL data generated in step S1306 together to generate combined PDL data.

In step S1308, the CPU 201 transmits a perforation processing instruction and the combined PDL data generated in step S1307 to the designated printing apparatus 102 or 103, and the process in the flowchart in FIG. 13 is ended. The designated printing apparatus 102 or 103 performs printing including the perforation line on paper and performs the perforation processing based on the received PDL data. At this time, the printing apparatus 102 or 103 prints the perforation line at a position corresponding to the perforation processing position.

Figure 14B:
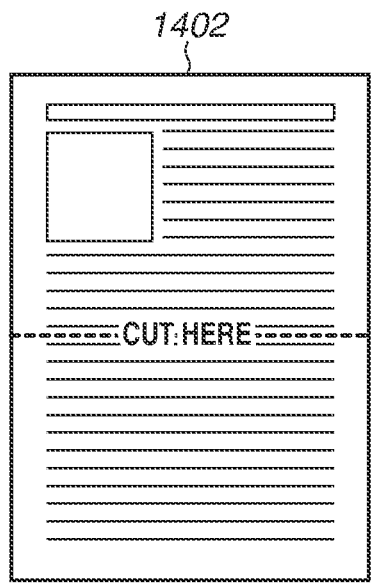
Figure 14C:
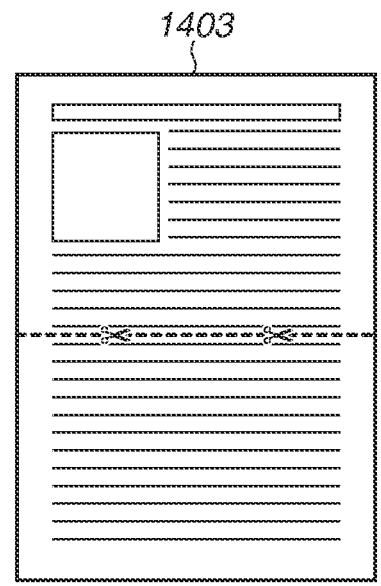

The CPU 201 can also generate PDL data for printing results 1402 and 1403 with a character string or a mark added to complement the perforation line as illustrated in FIGS. 14B and 14C. A printing result 1401 in FIG. 14A is an example of a printing result with the perforation line printed. The printing result 1402 in FIG. 14B is an example of a printing result with characters "cut here" printed superimposed on the perforation line. The printing result 1403 in FIG. 14C is an example of a printing result with marks of scissors printed superimposed on the perforation line.

Figure 15:
FIG. 15 is a diagram illustrating an example of a display of the printer driver.

FIG. 15 is a diagram illustrating an example of the perforation details dialog 1210 for designating the printing results 1401 to 1403 illustrated in FIGS. 14A to 14C. The perforation details dialog 1210 in FIG. 15 includes settings 1511 to 1517 in addition to the perforation details dialog 1210 illustrated in FIG. 12B.

The user can set the settings 1511 to 1517 as well as the settings 1211 to 1214 on the perforation details dialog 1210. The user can select the setting 1511 "print characters/marks over perforations". In a case where the setting 1511 is not selected, the CPU 201 generates PDL data for the printing result 1401 in FIG. 14A based on the settings 1211 to 1214. In a case where the setting 1511 is selected, the CPU 201 can generate PDL data for the printing result 1402 in FIG. 14B or PDL data for the printing result 1403 in FIG. 14c. In a case where the setting 1511 "print characters/marks over perforations" is set to on, the user can set the setting 1512 of "characters" or the setting 1515 of "marks" to on.

The user can also enter characters to be printed superimposed on perforations in the setting 1513. As an initial setting of the setting 1513 of characters to be printed, "cut here" are input. Further, the user can select a printing position of the characters to be printed via the setting 1514 for printing position. For the setting 1514 of printing position, for example, "left edge", "center", or "right edge" can be selected. In a case where the setting 1512 of characters is set to on, the CPU 201 generates second PDL data for the printing result 1402 on which the characters to be printed that are entered in the setting 1513 are printed on the printing position selected via the setting 1514 such that the characters are overlapped on the perforations based on the settings 1211 to 1214.

The user can also select a mark (e.g., "scissors" or "cutter") to be printed over perforations via the setting 1516 of marks to be printed. Further, the user can select a printing position of the mark to be printed via the setting 1517 of printing position. For the setting 1517 of printing position, for example, "left", "center", "right", "left and right", or "all" can be selected. In a case where the setting 1515 of marks is set to on, the CPU 201 generates second PDL data for the printing result 1403 on which the mark to be printed that is selected via the setting 1516 are printed on the printing position selected via the setting 1517 such that the mark is overlapped on the perforations based on the settings 1211 to 1214.

The characters to be printed of the setting 1513 can be changed from an initial setting to desired character strings. In the setting 1516 of marks to be printed, a mark or diagram of scissors can be displayed instead of displaying "scissors". The user can enter a desired mark in the setting 1516 of marks to be printed.

While a specific portion is selected as a perforation processing target portion via the item 1202 for designating the perforation processing 1201 in FIG. 12A, a position can be designated freely by inputting a distance from a sheet edge. Further, while a case where the perforation processing is performed only along a vertical direction with respect to a sheet conveyance direction is described above, a plurality of perforation processing target positions can be designated simultaneously and freely also along a horizontal direction.

For example, the printing apparatus 102 or 103 can perform the perforation processing and can print a perforation line on a coupon ticket or a payment slip.

As described above, for the item 1202 in FIG. 12A, the CPU 201 functions as a perforation processing setting unit and sets whether to perform the perforation processing to form a perforation-shaped cut in a physical medium based on a user operation. The physical medium is, for example, paper.

Further, for the setting 1211 in FIG. 12B, the CPU 201 functions as a line setting unit and sets whether to print a line at a position corresponding to a position of the perforation-shaped cut on the physical medium based on a user operation.

In step S1308 in FIG. 13, the CPU 201 functions as an instruction unit and instructs the printing apparatus 102 or 103 to perform the perforation processing and to print the line based on the setting of the item 1202 and the setting 1211.

Specifically, in step S1307, the CPU 201 functions as a combining unit and combines the second print data (second PDL data) indicating the line with the first print data (first PDL data) to be printed on the physical medium. In step S1308, the CPU 201 transmits a command to perform the perforation processing and the above-mentioned combined print data (PDL data) to the printing apparatus 102 or 103.

While the CPU 201 combines the second PDL data and the first PDL data together in the above-described case, aspects of the present disclosure is not limited to this case. The CPU 201 can transmit the first PDL data and a combining control command to the printing apparatus 102 or 103. In this case, a printer controller in the printing apparatus 102 or 103 combines the first PDL data and the second PDL data together. In this case, the CPU 201 does not generate second PDL data but generates a control command in step S1306. Further, the CPU 201 does not combine PDL data in step S1307 and adds a control command in the first PDL data to be transmitted to the printing apparatus 102 or 103 in step S1308. Specifically, in step S1308, the CPU 201 transmits a perforation processing command, a line printing command, and the first PDL data (print data) to the printing apparatus 102 or 103.

The CPU 201 sets a perforation-shaped cut position based on a user operation via the item 1202 in FIG. 12A. In step S1308 in FIG. 13, the CPU 201 instructs the printing apparatus 102 or 103 to perform the perforation processing and to print the line based on the set perforation-shaped cut position.

The CPU 201 sets a type, a thickness, and a color of the line based on a user operation via the settings 1212 to 1214 in FIG. 12B. In step S1308 in FIG. 13, the CPU 201 instructs the printing apparatus 102 or 103 to print the line based on the set type, the set thickness, and the set color of the line. At least one of the type, the thickness, and the color of the line can be configurable.

The CPU 201 functions as a character setting unit and sets whether to print characters at a position corresponding to the perforation-shaped cut position on the physical medium based on a user operation via the setting 1512 in FIG. 15. In step S1308 in FIG. 13, the CPU 201 instructs the printing apparatus 102 or 103 to print characters based on the setting 1512.

The CPU 201 sets characters to be printed based on a user operation via the setting 1513 in FIG. 15. In step S1308 in FIG. 13, the CPU 201 instructs the printing apparatus 102 or 103 to print the characters set via the setting 1513.

The CPU 201 sets a position of the characters to be printed based on a user operation via the setting 1514 in FIG. 15. In step S1308 in FIG. 13, the CPU 201 instructs the printing apparatus 102 or 103 to print the characters at the position set via the setting 1514.

The CPU 201 functions as a mark setting unit and sets whether to print a mark at a position corresponding to the perforation-shaped cut position on the physical medium based on a user operation via the setting 1515 in FIG. 15. In step S1308 in FIG. 13, the CPU 201 instructs the printing apparatus 102 or 103 to print a mark based on the setting 1515.

The CPU 201 sets a mark to be printed based on a user operation via the setting 1516 in FIG. 15. In step S1308 in FIG. 13, the CPU 201 instructs the printing apparatus 102 or 103 to print the mark set via the setting 1516.

The CPU 201 sets a position of the mark to be printed based on a user operation via the setting 1517 in FIG. 15. In step S1308 in FIG. 13, the CPU 201 instructs the printing apparatus 102 or 103 to print the mark at the position set via the setting 1517.

A preview image of the perforation line to be printed can be displayed based on setting values that are set via the setting screen in FIG. 15.

As described above, according to the present exemplary embodiment, the host computer 101 does not have to generate a perforation line on print data on the application 801. The host computer 101 can designate the perforation processing and the perforation line printing on the printer driver 301, so that PDL data is generated to draw the perforation line over the perforated portion without causing a misalignment. Perforation line PDL data is combined to correspond to a physical perforation processing position, and thereby reduces user efforts and fruitless printing.

Figure 16A:
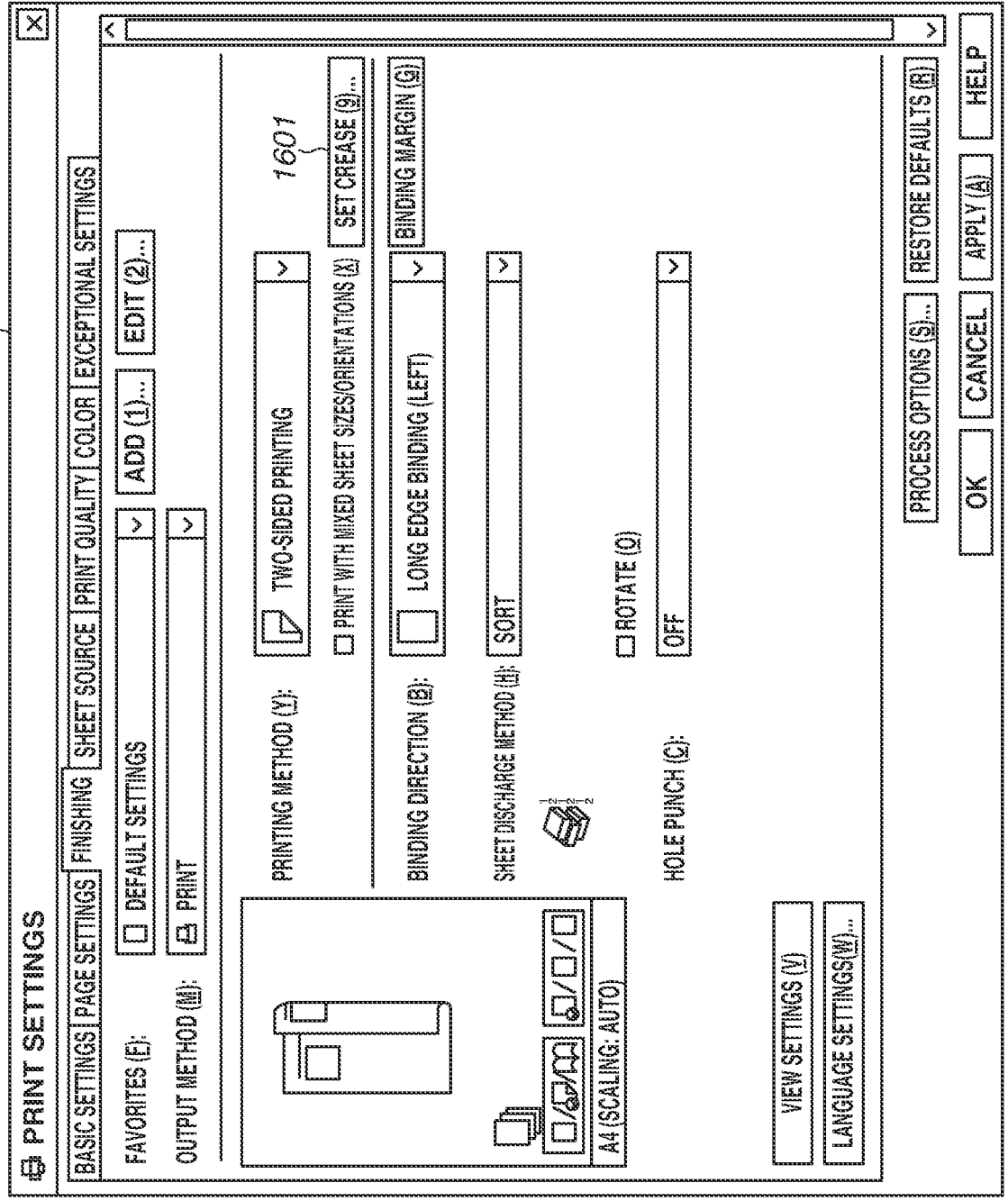
FIGS. 16A and 16B are diagrams illustrating an example of a display of the printer driver.
Figure 16B:
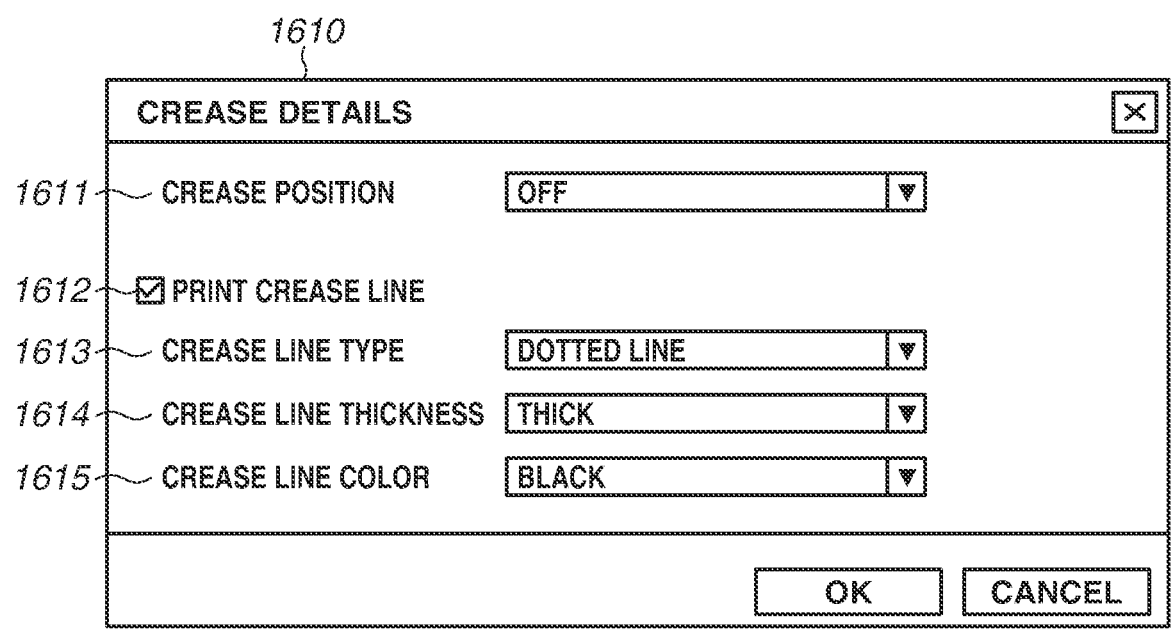

FIGS. 16A and 16B are diagrams illustrating an example of a display of a printer driver 301 according to a second exemplary embodiment. Differences between the second exemplary embodiment and the first exemplary embodiment will be described below. The CPU 201 displays a print setting dialog 1600 illustrated in FIG. 16A. A user can click a set-crease button 1601 on the print setting dialog 1600. In a case where the set-crease button 1601 is clicked, the CPU 201 displays a crease details dialog 1610 illustrated in FIG. 16B. The user can set a crease position 1611, a print-crease-line setting 1612, a crease line type 1613, a crease line thickness 1614, and a crease line color 1615 on the crease details dialog 1610. Information that can be set via the crease details dialog 1610 is described in the printer specification description file 304. In a case where no hardware for performing crease processing is connected to a printer associated with a print queue, the set-crease button 1601 is grayed out and cannot be selected. The set-crease button 1601 can be hidden in a case where no hardware for performing the crease processing is connected to the printer associated with the print queue.

A finisher capable of performing the crease processing on mediums is attached to the printing apparatuses 102 and 103. The crease processing refers to the processing of forming a linear scratch (fold processing) on a surface of an output medium such as paper so that the medium can be folded neatly along a predetermined position. The CPU 201 can instruct the printing apparatus 102 or 103 to perform the crease processing along a designated position based on the setting of the crease position 1611.

Figure 17:
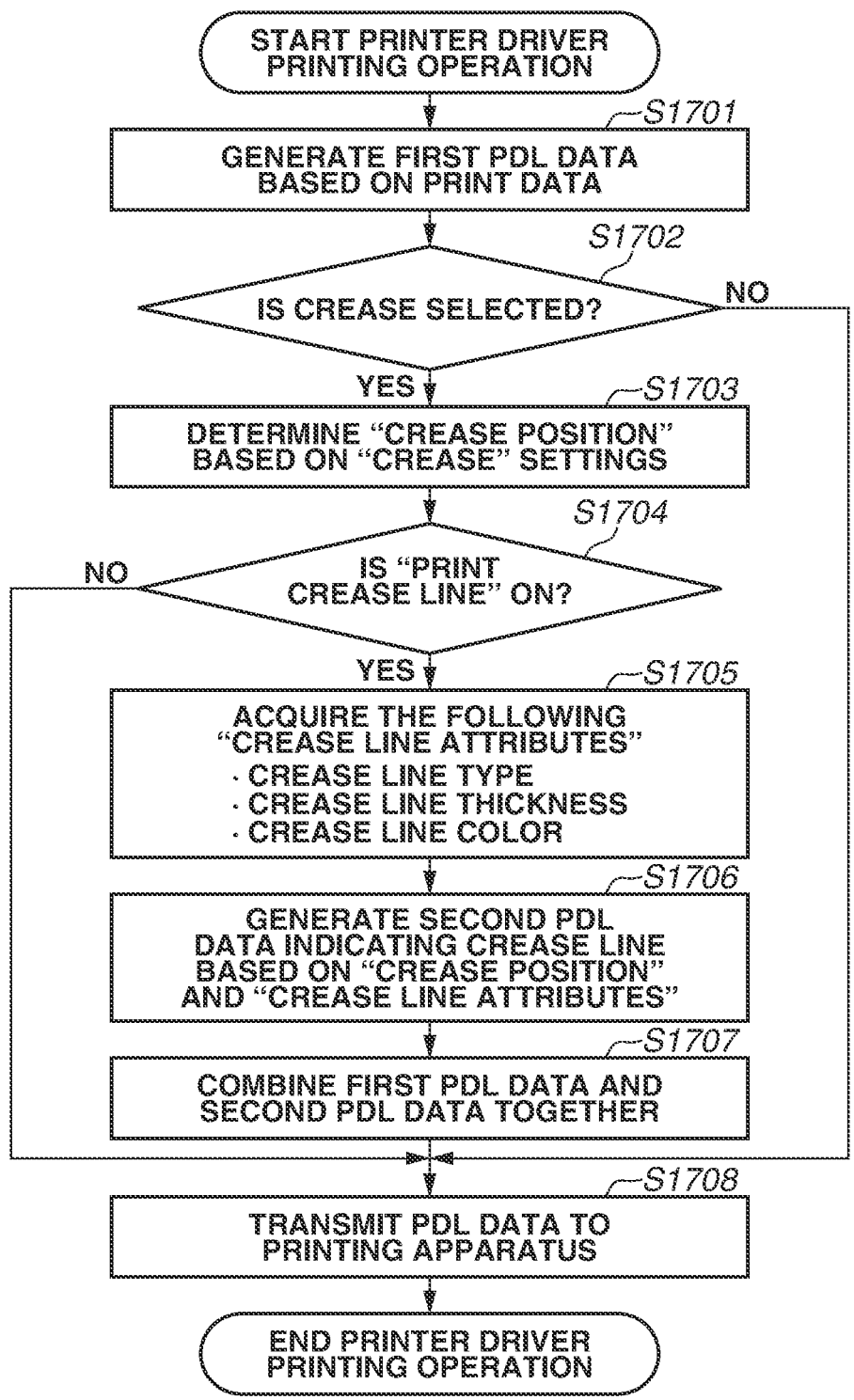
FIG. 17 is a flowchart illustrating a processing method of the printer driver.

FIG. 17 is a flowchart illustrating a processing method of the printer driver 301 of the host computer 101. In a case where the printer driver 301 is activated, the CPU 201 starts a process illustrated in the flowchart in FIG. 17. The user can designate the crease processing instead of the perforation processing.

In step S1701, the CPU 201 generates first PDL data based on print data generated by the application 801 to cause the designated printing apparatus 102 or 103 to perform printing. In step S1702, the CPU 201 determines whether the crease position 1611 is set to a setting for designating the crease processing. In a case where the crease position 1611 is set to a setting for designating the crease processing (YES in step S1702), the processing proceeds to step S1703, whereas in a case where the crease position 1611 is not set to a setting for designating the crease processing (NO in step S1702), the processing proceeds to step S1708. In step S1708, the CPU 201 transmits the first PDL data to the designated printing apparatus 102 or 103, and the process in the flowchart in FIG. 17 is ended.

In step S1703, the CPU 201 determines a crease processing target position based on the crease position 1611. The user can select a crease processing target position via the crease position 1611.

In step S1704, the CPU 201 determines whether the print-crease-line setting 1612 is on. In a case where the print-crease-line setting 1612 is on (YES in step S1704), the processing proceeds to step S1705, whereas in a case where the print-crease-line setting 1612 is not on (NO in step S1704), the processing proceeds to step S1708. In step S1708, the CPU 201 transmits a crease processing instruction and the first PDL data to the designated printing apparatus 102 or 103, and the process in the flowchart in FIG. 17 is ended.

In step S1705, the CPU 201 acquires setting information about the crease line type 1613, the crease line thickness 1614, and the crease line color 1615 of the crease line to be printed. Next, in step S1706, the CPU 201 generates second PDL data indicating the crease line to be printed based on the determined crease processing target position, the crease line type 1613, the crease line thickness 1614, and the crease line color 1615 of the crease line to be printed. A crease line printing position is the crease processing target position.

In step S1707, the CPU 201 combines the first PDL data generated in step S1701 and the second PDL data generated in step S1706 together to generate combined PDL data.

In step S1708, the CPU 201 transmits a crease processing instruction and the combined PDL data generated in step S1707 to the designated printing apparatus 102 or 103, and the process in the flowchart in FIG. 17 is ended. The designated printing apparatus 102 or 103 performs printing including the crease line on paper and performs the crease processing based on the received PDL data. At this time, the printing apparatus 102 or 103 prints the crease line at a position corresponding to the crease processing position.

Figure 18A:
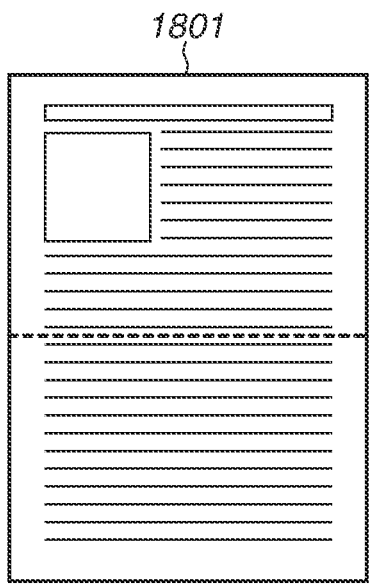
FIGS. 18A to 18E are diagrams illustrating an example of a print in a case where a crease line position and characters are added.
Figure 18B:
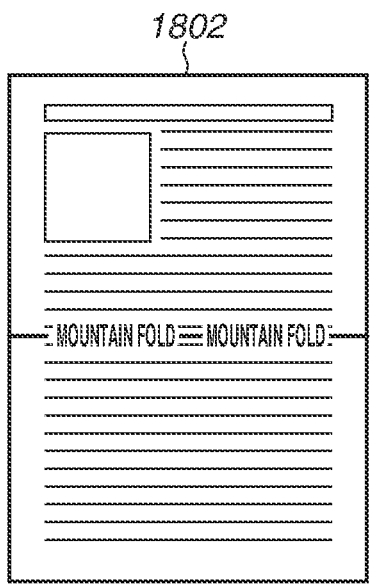
Figure 18C:
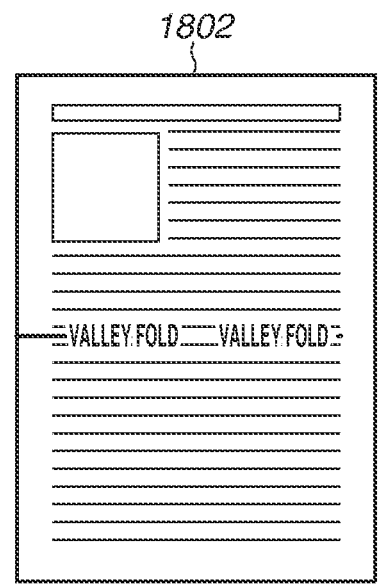

The CPU 201 can also generate PDL data for a printing results 1802 and 1803 with a character string added to complement the crease line as illustrated in FIGS. 18B and 18C. A printing result 1801 illustrated in FIG. 18A is an example of a printing result with the crease line printed. The printing result 1802 illustrated in FIG. 18B is an example of a printing result with characters "mountain fold" superimposed on the crease line. The printing result 1803 in FIG. 18C is an example of a printing result with characters "valley fold" superimposed on the crease line.

Figure 18D:
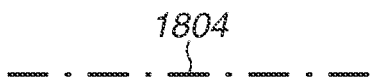
Figure 18E:

The CPU 201 can also change the line type of the crease line as illustrated in FIGS. 18D and 18E. A crease line 1804 in FIG. 18D illustrates an example of a dashed-and-dotted line indicating the mountain fold. A crease line 1805 in FIG. 18E illustrates an example of a dashed-and-double-dotted line indicating the valley fold.

Figure 19:
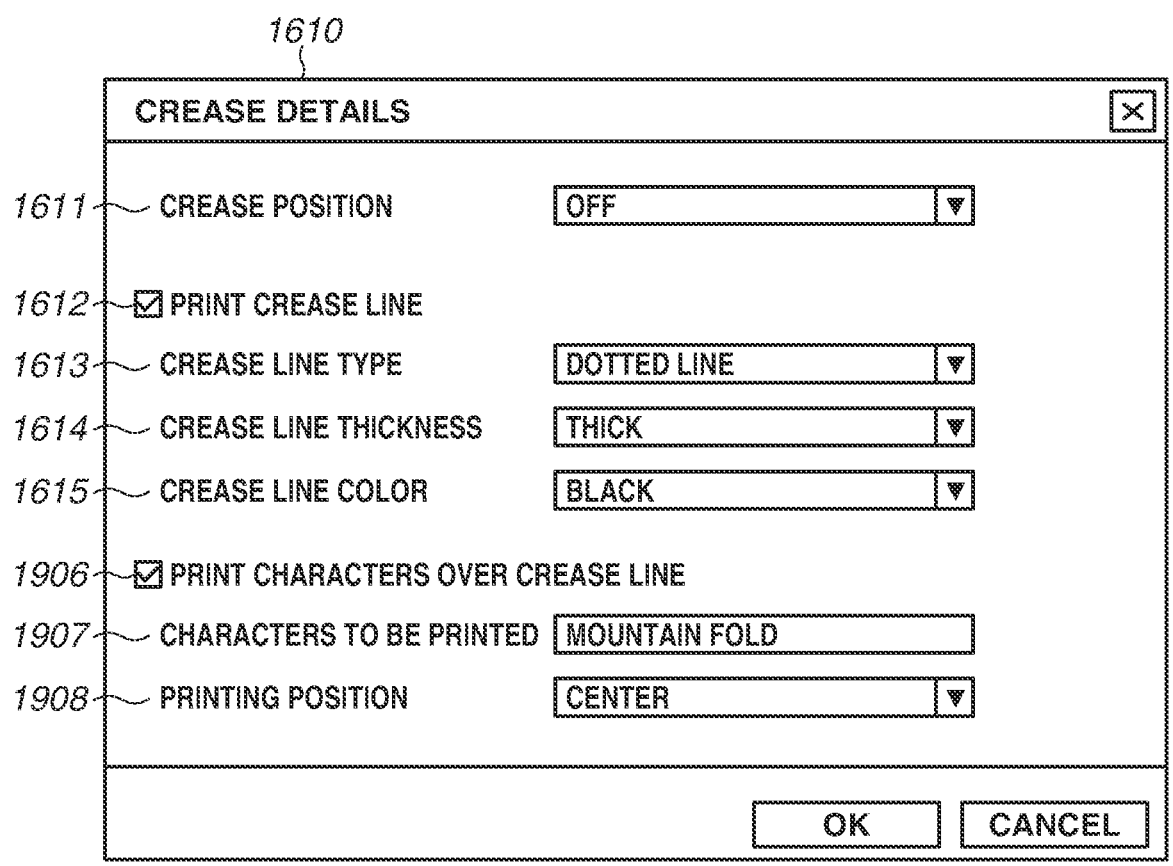
FIG. 19 is a diagram illustrating an example of a display of the printer driver.

FIG. 19 is a diagram illustrating an example of the crease details dialog 1610 for designating the printing results 1801 to 1803 or the crease lines 1804 and 1805 in FIGS. 18A to 18E.

The crease details dialog 1610 in FIG. 19 further includes settings 1906 to 1908 in addition to the crease details dialog 1610 illustrated in FIG. 16B.

The user can set the settings 1906 to 1908 via the crease details dialog 1610 as well as the settings 1611 to 1615. The user can select the setting 1906 of "print-characters over crease line". In a case where the setting 1906 is not selected, the CPU 201 generates PDL data for the printing result 1801 in FIG. 18A, the crease line 1804 in FIG. 18D, or the crease line 1805 in FIG. 18E based on the settings 1611 to 1615.

Further, in a case where the setting 1906 is selected, the CPU 201 can generate PDL data for the printing result 1802 in FIG. 18B or the printing result 1803 in FIG. 18C. In a case where the setting 1906 of "print characters over crease line" is selected, the user can enter characters in the setting 1907 of "characters to be printed" and select the setting 1908 of "printing position". An initial setting of the setting 1907 of "characters to be printed" is, for example, "mountain fold". The CPU 201 generates second PDL data for the printing result 1802 or 1803 of printing the characters to be printed that are entered in the setting 1907 at the printing position selected via the setting 1908 such that the characters are superimposed on the crease line based on the settings 1611 to 1615.

While not illustrated, the CPU 201 can assign a dashed-and-dotted line to the crease line 1804 for a mountain fold illustrated in FIG. 18D and a dashed-and-double-dotted line to the crease line 1805 for a valley fold illustrated in FIG. 18D. Further, the CPU 201 can automatically switch the crease line 1804 for a mountain fold and the crease line 1805 for a valley fold.

While a specific portion is selected as a crease processing target position via the crease position 1611 in FIG. 16A in the above-described case, a position can be designated freely by inputting a distance from a sheet edge. Further, while a case where the crease processing is performed only along the vertical direction with respect to the sheet conveyance direction is described above, a plurality of crease processing target positions can be designated simultaneously and freely also along the horizontal direction.

As described above, for the setting 1611 in FIG. 16B, the CPU 201 functions as a crease processing setting unit and sets whether to perform the crease processing to form a linear scratch for folding on a surface of a physical medium based on a user operation.

The CPU 201 functions as a line setting unit and sets whether to print a line at a position corresponding to the linear scratch position on the physical medium based on a user operation via the setting 1612 in FIG. 16B.

In step S1708 in FIG. 17, the CPU 201 functions as an instruction unit and instructs the printing apparatus 102 or 103 to perform the crease processing and to print the line based on the settings 1611 and 1612. Specifically, in step S1707, the CPU 201 functions as a combining unit and combines the second print data (second PDL data) indicating the line with the first print data (first PDL data) to be printed on the physical medium. In step S1708, the CPU 201 transmits a crease processing command and the combined print data to the printing apparatus 102 or 103.

While the CPU 201 combines the second PDL data with the first PDL data in the above-described case, aspects of the present disclosure is not limited to this case. The CPU 201 can transmit the first PDL data and a combining control command to the printing apparatus 102 or 103. In this case, the printer controller in the printing apparatus 102 or 103 combines the first PDL data with the second PDL data. In this case, the CPU 201 does not generate second PDL data but generates a control command in step S1706. Further, the CPU 201 does not combine PDL data in step S1707 and adds the control command in the first PDL data to be transmitted to the printing apparatus 102 or 103 in step S1708. Specifically, in step S1708, the CPU 201 transmits a crease processing command, a line printing command, and the first PDL data (print data) to the printing apparatus 102 or 103.

The CPU 201 sets a linear scratch position based on a user operation via the setting 1611 in FIG. 16B. In step S1708 in FIG. 17, the CPU 201 instructs the printing apparatus 102 or 103 to perform the crease processing and to print the line based on the linear scratch position set via the setting 1611.

The CPU 201 sets the type, the thickness, and the color of the line based on a user operation via the settings 1613 to 1615 illustrated in FIG. 16B. In step S1708 in FIG. 17, the CPU 201 instructs the printing apparatus 102 or 103 to print the line based on the type, the thickness, and the color of the line that are set via the settings 1613 to 1615. At least one of the type, the thickness, and the color of the line can be configurable.

The CPU 201 functions as a character setting unit and sets whether to print characters at the position corresponding to the linear scratch position on the physical medium based on a user operation via the setting 1906 in FIG. 19. In step S1708 in FIG. 17, the CPU 201 instructs the printing apparatus 102 or 103 to print characters based on the setting 1906.

The CPU 201 sets characters to be printed based on a user operation via the setting 1907 in FIG. 19. In step S1708 in FIG. 17, the CPU 201 instructs the printing apparatus 102 or 103 to print the characters set via the setting 1907.

The CPU 201 sets a position of the characters to be printed based on a user operation via the setting 1908 in FIG. 19. In step S1708 in FIG. 17, the CPU 201 instructs the printing apparatus 102 or 103 to print the characters at the position set via the setting 1908.

As described above, according to the present exemplary embodiment, the host computer 101 does not have to generate a crease line on print data on the application 801. The host computer 101 can designate the crease processing and the crease line printing on the printer driver 301, so that PDL data is generated to draw the crease line over the crease processing position without causing a misalignment. Crease line PDL data is combined to correspond to a physical crease processing position, and this reduces user efforts and fruitless printing.

The present disclosure is realized also by the following process. Specifically, a program for realizing one or more functions according to the above-described exemplary embodiments is fed to a system or an apparatus via a network or a storage medium, and one or more processors of a computer of the system or the apparatus read and execute the program. Further, the present disclosure is realized also by a circuit (e.g., application-specific integrated circuit (ASIC)) that realizes one or more functions.

It should be noted that the above-described exemplary embodiments are mere illustrations of specific examples in implementing the present disclosure and that the technical scope of the present disclosure should not be interpreted narrowly based on the exemplary embodiments. Specifically, the present disclosure can be implemented in various forms without departing from the technical concept or major features of the present disclosure.

The present disclosure facilitates printing of a line at a position corresponding to a perforation processing position or a crease processing position.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-209601, filed Dec. 23, 2021, which is hereby incorporated by reference herein in its entirety.

What is claimed is:

1. An information processing apparatus comprising:
    a processing setting unit configured to set whether to perform predetermined processing on a physical medium;
    a line setting unit configured to set whether to print a line at a position corresponding to a position on which the predetermined processing is to be performed on the physical medium; and
    an instruction unit configured to instruct a printing apparatus to perform the predetermined processing and to print the line based on the setting by the processing setting unit and the setting by the line setting unit.

2. The information processing apparatus according to claim 1, further comprising a combining unit configured to combine second print data with first print data to be printed on the physical medium, the second print data indicating the line,
    wherein the instruction unit transmits, to the printing apparatus, a command to perform the predetermined processing and the combined print data based on the setting by the processing setting unit and the setting by the line setting unit.

3. The information processing apparatus according to claim 2, wherein the first print data and the second print data are PDL data.

4. The information processing apparatus according to claim 1, wherein the instruction unit transmits, to the printing apparatus, a command to perform the predetermined processing and a command to print the line based on the setting by the processing setting unit and the setting by the line setting unit.

5. The information processing apparatus according to claim 4, wherein the instruction unit transmits, to the printing apparatus, the command to perform the predetermined processing, the command to print the line, and print data.

6. The information processing apparatus according to claim 5, wherein the print data is PDL data.

7. The information processing apparatus according to claim 1,
    wherein the line setting unit sets a type, a thickness, or a color of the line, and
    wherein the instruction unit instructs the printing apparatus to print the line based on the set type, the set thickness, or the set color of the line.

8. The information processing apparatus according to claim 1, further comprising another setting unit configured to set whether to print a character or a mark at the position corresponding to the position on which the predetermined processing is to be performed on the physical medium,
    wherein the instruction unit instructs the printing apparatus to print the character or the mark based on the setting by the other setting unit.

9. The information processing apparatus according to claim 8,
    wherein the other setting unit sets the character or the mark to be printed, and
    wherein the instruction unit instructs the printing apparatus to print the set character or the set mark.

10. The information processing apparatus according to claim 9, wherein the other setting unit sets a position of the character or the mark to be printed, and wherein the instruction unit instructs the printing apparatus to print the character or the mark at the set position.

11. The information processing apparatus according to claim 1, wherein the predetermined processing is perforation processing of forming a perforation-shaped cut in the physical medium.

12. The information processing apparatus according to claim 11, wherein the processing setting unit sets a position of the perforation-shaped cut, and wherein the instruction unit instructs the printing apparatus to perform the perforation processing and to print the line based on the set position of the perforation-shaped cut.

13. The information processing apparatus according to claim 1, wherein the predetermined processing is crease processing of forming a linear scratch for folding on a surface of the physical medium.

14. The information processing apparatus according to claim 13, wherein the instruction unit transmits, to the printing apparatus, a command to perform the crease processing and a command to print the line based on the setting by the processing setting unit and the setting by the line setting unit.

15. A method for controlling an information processing apparatus, the method comprising:

performing processing setting to set whether to perform predetermined processing on a physical medium;

performing line setting to set whether to print a line at a position corresponding to a position on which the predetermined processing is to be performed on the physical medium; and instructing a printing apparatus to perform the predetermined processing and to print the line based on setting by the processing setting and setting by the line setting.

16. The method according to claim 15, further comprising combining second print data with first print data to be printed on the physical medium, the second print data indicating the line, wherein the instructing transmits, to the printing apparatus, a command to perform the predetermined processing and the combined print data based on the setting by the processing setting and the setting by the line setting.

17. The method according to claim 15, wherein the instructing transmits, to the printing apparatus, a command to perform the predetermined processing and a command to print the line based on the setting by the processing setting and the setting by the line setting.

18. The method according to claim 15, wherein the line setting sets a type, a thickness, or a color of the line, and wherein the instructing instructs the printing apparatus to print the line based on the set type, the set thickness, or the set color of the line.

19. The method according to claim 15, further comprising performing other setting to set whether to print a character or a mark at the position corresponding to the position on which the predetermined processing is to be performed on the physical medium, wherein the instructing instructs the printing apparatus to print the character or the mark based on the setting by the other setting.

20. A non-transitory computer-readable storage medium storing a program for causing a computer to perform a method of controlling an information processing apparatus, the method comprising:

performing processing setting to set whether to perform predetermined processing on a physical medium;

performing line setting to set whether to print a line at a position corresponding to a position on which the predetermined processing is to be performed on the physical medium; and instructing a printing apparatus to perform the predetermined processing and to print the line based on the setting by the processing setting and the setting by the line setting.

* * * * *